Sept. 11, 1923. 1,467,835
M. E. BUHSE
APPARATUS FOR COATING ICE CREAM CONES
Filed April 5, 1922
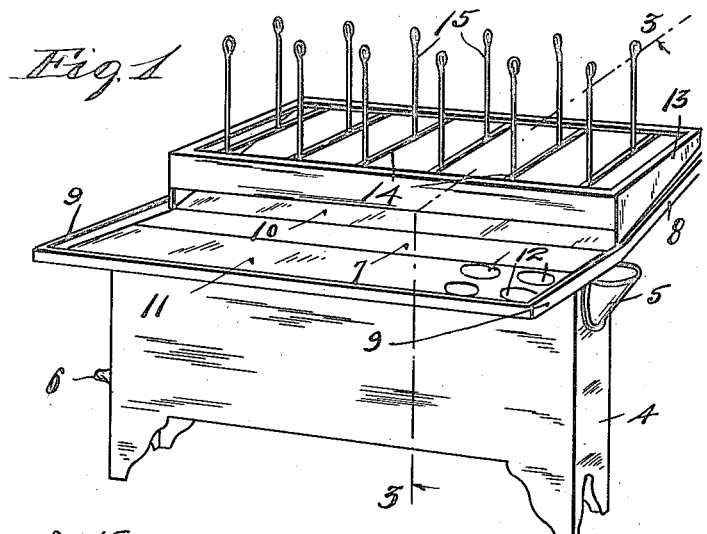
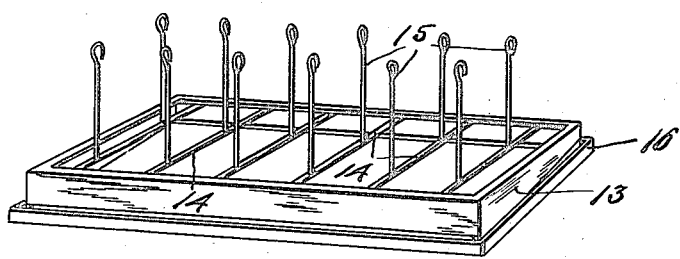
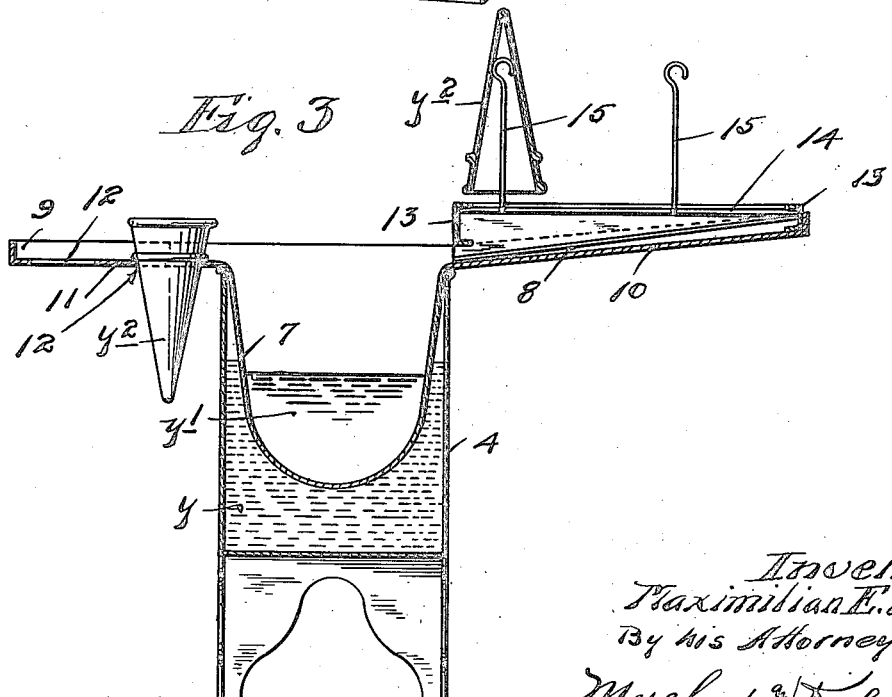

Patented Sept. 11, 1923.

1,467,835

UNITED STATES PATENT OFFICE.

MAXIMILIAN E. BUHSE, OF MINNEAPOLIS, MINNESOTA.

APPARATUS FOR COATING ICE-CREAM CONES.

Application filed April 5, 1922. Serial No. 549,685.

*To all whom it may concern:*

Be it known that I, MAXIMILIAN E. BUHSE, a citizen of the United States, residing at Minneapolis, in the county of Hennepin and State of Minnesota, have invented certain new and useful Improvements in Apparatus for Coating Ice-Cream Cones; and I do hereby declare the following to be a full, clear, and exact description of the invention, such as will enable others skilled in the art to which it appertains to make and use the same.

My present invention has for its object to provide a simple and efficient apparatus for use in coating or lining ice cream cones with chocolate, in accordance with my invention disclosed and claimed in application for Letters Patent of the United States, S. N. 531,590, filed of date January 25, 1922, and entitled "Ice cream cones."

This apparatus may be made in various sizes, but generally will be a small apparatus designed for use in the retail trade for coating or lining ice cream cones with chocolate so that the retailer may keep on hand a small number of cones ready for sale.

The preferred form of the apparatus is illustrated in the accompanying drawings, wherein like characters indicate like parts throughout the several views.

Referring to the drawings:

Fig. 1 is a perspective showing the complete apparatus;

Fig. 2 is a perspective showing the cone-supporting rack and the dripping pan that is used as an auxiliary part of the apparatus; and Fig. 3 is a transverse vertical section taken centrally through the apparatus.

The numeral 4 indicates a rectangular water tank provided near the top of one end with an inlet funnel 5, and near the bottom of its other end, with a drain valve 6.

The numeral 7 indicates an oblong vat that detachably fits within the tank 4, and at its ends has reversely projecting arms 8 and 9 that respectively support an incline drain board 10 and a cone-supporting shelf 11, which latter has spaced holes 12 that afford seats to support the cones, open ends upward.

The numeral 13 indicates a rectangular rack having cross bars 14 that support upstanding posts in the form of rods 15 having curved upper ends or heads. The numeral 16 indicates a flat shallow drip pan that may be set at one side of the tank.

Hot water Y will be poured into the tank 4 to keep the chocolate coating material $Y^1$ within the vat 7 at the proper temperature and, hence, in proper fluid condition. Here it will be noted that no heater, such as a burner or the like, is required in this apparatus. Water heated on the stove, in a tea kettle or the like, may from time to time be poured into the tank and the cooler water drawn off therefrom, so as to maintain an approximately even temperature of the molten chocolate.

The number of cones $Y^2$ may be kept within easy reach by placing them in the holes 12 of the table 11. When a cone is to be lined with chocolate, a small amount of liquid chocolate may be dipped from the vat by the use of a spoon or small ladle and poured into the cones. Then, by rotating the cone in an oblique position, the chocolate will be evenly distributed over the interior of the cone and will very quickly cool and harden. The chocolate-lined cones inverted will be placed on the heads of the supporting posts 15 while the rack 13 is placed on the drain board 10. Any drippings from the cones will drop on the drip board and will be directed back into the vat. When cones are to be made in a considerable number and in rapid succession, the one rack with the cones thereon may be removed from the drip board 10 and placed on the drip pan 16 and another rack may then be placed on the drip board.

It is important to note that the vat 7, drip board 10 and shelf 11 are connected in an entirety and are together removable from the tank and together applicable thereto. In this arrangement, the vat, which closely fits the upper rim portion of the tank, will properly position the drip board and table, and said portion of the table will support said vat, with the lower portion properly emersed in the hot water of the tank, also closing the top of the tank, thus confining the heat of the water so that the water will be kept in a hot condition for a long time. The arrangement also affords an air space above the water between the walls of the tank and the vat, which gives good insulation against the escape of heat. Moreover, the air in this space will be kept hot or warm by the water.

The chocolate coating substance which I have used should be kept at approximately 98 degrees. Of course, this apparatus may be used for coating cones with other substances than chocolate, and which substance may require other degrees of temperature, which can be maintained by the proper supply of hot water. As already indicated, this apparatus is especially designed for carrying commercially into effect the invention disclosed. My above identified application is directed broadly to the lining or coating of these cones with chocolate or other edible candy substance or material.

What I claim is:

1. An apparatus for coating or lining ice cream cones comprising a hot water tank, a vat for coating material set into the tank, a drip board supported adjacent to one side of said vat and arranged to deliver the drippings back into said vat, and a cone supporting post supported above said drip board.

2. An apparatus for lining or coating ice cream cones comprising a hot water tank, a vat detachably seated in said tank and closing the top thereof, a drip board connected to one edge of said vat, a rack detachably mounted on said drip board, and a cone-supporting post directly mounted on said rack.

3. An apparatus for lining or coating ice cream cones comprising a hot water tank, a vat detachably mounted in and closing the top of said tank, an inclined drip board directly secured on one side of said vat, said vat, drip board and table being connected and movable as an entirety, a rack detachably mounted on said drip board and provided with cross bars, and a cone-supporting post secured to said cross bars and having bent ends forming heads for direct contact with the interiors of the cones.

In testimony whereof I affix my signature.

MAXIMILIAN E. BUHSE.